United States Patent
Yan

(10) Patent No.: US 8,793,445 B1
(45) Date of Patent: Jul. 29, 2014

(54) METHOD AND SYSTEM FOR IMPROVED DESKEWING OF DATA

(75) Inventor: Junjie Yan, Newfoundland (CA)

(73) Assignee: Altera Corporation, San Jose, CA (US)

( * ) Notice: Subject to any disclaimer, the term of this patent is extended or adjusted under 35 U.S.C. 154(b) by 273 days.

(21) Appl. No.: 13/358,439

(22) Filed: Jan. 25, 2012

(51) Int. Cl.
*G06F 12/04* (2006.01)
*G06F 12/06* (2006.01)
*G06F 7/32* (2006.01)
*G06F 13/16* (2006.01)

(52) U.S. Cl.
CPC ............ *G06F 12/04* (2013.01); *G06F 12/0638* (2013.01); *G06F 12/0646* (2013.01); *G06F 7/32* (2013.01); *G06F 13/1657* (2013.01)
USPC ............... 711/157; 711/5; 711/151; 711/154; 711/156

(58) Field of Classification Search
CPC . G06F 12/04; G06F 12/0638; G06F 12/0646; G06F 7/32; G06F 13/1657
USPC ............................... 711/157, 5, 151, 154, 156
See application file for complete search history.

(56) References Cited

U.S. PATENT DOCUMENTS

| 7,454,537 B1 * | 11/2008 | Xue ................................. 710/52 |
| 7,995,695 B2 * | 8/2011 | Ahmed et al. ................. 375/371 |
| 2003/0112827 A1 * | 6/2003 | Cox et al. ....................... 370/509 |
| 2010/0215060 A1 | 8/2010 | Haas |

* cited by examiner

*Primary Examiner* — Stephen Elmore

(57) ABSTRACT

Embodiments of the present invention are directed to a method, computer-readable medium and system for deskewing data. More specifically, skewed data is accessed and written into a plurality of memories in an aligned manner. Each memory may be associated with a respective lane of a multiple lane distribution (MLD) system and may receive a respective initial portion of data associated with a frame. The memory or lane that is the last to receive an initial portion of data associated with the frame may be determined. The address at which the initial portion of data is written into the memory may be determined using a write pointer associated with the memory. At least one read pointer associated with the memories may be set to the address to allow the initial portions of data to be contemporaneously read from the memories.

21 Claims, 15 Drawing Sheets

100

900

METHOD AND SYSTEM FOR IMPROVED DESKEWING OF DATA

BACKGROUND OF THE INVENTION

Multiple lane distribution (MLD) is commonly used for communicating data between a transmitter and receiver. MLD systems transmit data in parallel over multiple lanes or channels, where each lane may have different physical characteristics such as length, temperature and voltage. As a result, skew often occurs between the bitstreams transmitted over the multiple lanes.

Conventional receivers utilize framers to deskew the data. A respective framer and a respective first-in-first-out (FIFO) buffer are typically allocated to each lane. The framers determine the skew of the data for the lanes. The skews are used to determine offsets for writing the data into the FIFO buffers. As such, the skewed data may be realigned as it is written into the FIFO buffers with the offsets, thereby enabling deskewed data to be read from the FIFO buffers.

The realigned data is simultaneously read from the same memory location in all FIFO buffers at a predefined time. The predefined time is typically the time at which a predefined lane writes to a predefined memory location in a FIFO buffer, where the predefined lane and memory location are defined before runtime and not changed during runtime. The memory location for reading the data is also defined before runtime and not changed during runtime. Additionally, conventional receivers are unable to deskew data if the data read from all the FIFO buffers at the memory location includes a combination of new data (e.g., associated with a current frame) and old data (e.g., associated with a previous frame).

Accordingly, the deskewability or deskew tolerance of conventional receivers is limited. In a conventional receiver that allows reads and writes to the same location in the FIFO buffers, the maximum deskewability is determined by half the FIFO buffer depth minus one. For example, where a FIFO buffer has eight memory slots each holding one word of data, the maximum deskewability of the conventional receiver may be expressed as three memory slots or words of data. Accordingly, conventional receivers are unable to deskew data with a skew of half the FIFO buffer depth or greater.

SUMMARY OF THE INVENTION

Accordingly, a need exists to increase the deskewability of a system utilizing multiple lane distribution (MLD). Embodiments of the present invention provide novel solutions to these needs and others as described below.

Embodiments of the present invention are directed to a method, computer-readable medium and system for deskewing data. More specifically, skewed data is accessed and written into a plurality of memories (e.g., FIFO buffers, another type of memory, etc.) in an aligned manner. Each memory may be associated with a respective lane of an MLD system and may receive a respective initial portion of data associated with a frame. The memory or lane that is the last to receive an initial portion of data associated with the frame may be determined (e.g., using a write pointer and/or flag associated with the memory). The address at which the initial portion of data is written into the memory (e.g., that is the last to receive an initial portion of data associated with the frame) may be determined using a write pointer associated with the memory. At least one read pointer associated with the memories may be set to the address (e.g., determined from the write pointer) to allow the initial portions of data (and subsequent portions of data associated with the frame) to be contemporaneously read from the memories. As such, the address at which the last memory or lane receives an initial portion of data associated with a frame may be dynamically determined (e.g., on-the-fly, during runtime or operation of the system or circuit, etc.) and used to read the data from the memories in a deskewed or aligned state, thereby increasing the deskewability or deskew tolerance of the system.

In one embodiment, a method of deskewing data includes determining a memory of a plurality of memories that is a last memory to receive an initial portion of data associated with a frame, wherein the initial portion is one initial portion of a plurality of initial portions of the data, wherein each memory of the plurality of memories receives a respective initial portion of the plurality of initial portions of the data, and wherein each memory of the plurality of memories is associated with a respective write pointer of a plurality of write pointers. An address at which the initial portion of the data is stored in the memory is determined based on a write pointer associated with the memory. A read pointer associated with the plurality of memories is set to the address to allow the plurality of initial portions of the data to be contemporaneously read from the plurality of memories.

In another embodiment, a computer-readable medium has computer-readable program code embodied therein for causing a computer system to perform a method of deskewing data. And in yet another embodiment, a system includes a processor and a memory, wherein the memory includes instructions that when executed by the system implement a method of deskewing data.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
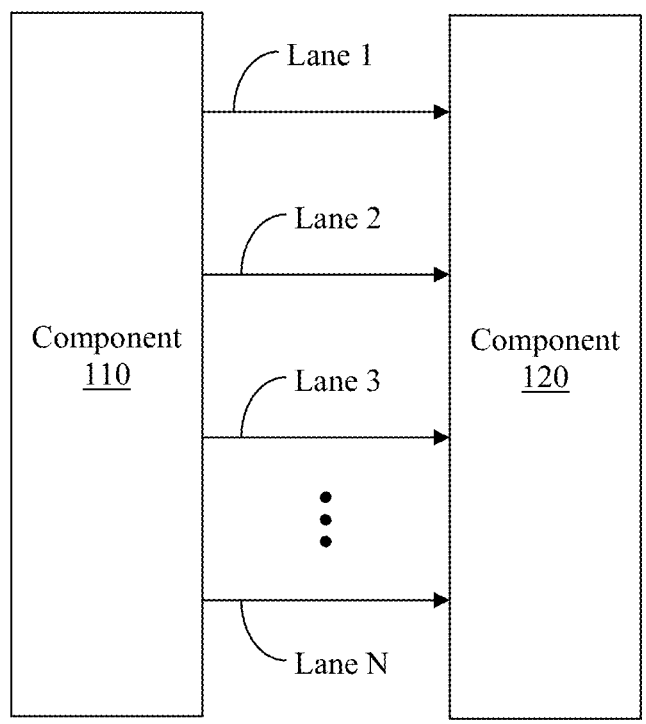
FIG. 1 shows an exemplary system for communicating data in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "accepting," "accessing," "adding," "analyzing," "applying," "assembling," "assigning," "calculating," "capturing," "collecting," "combining," "communicating," "comparing," "conducting," "creating," "defining," "depicting," "detecting," "determining," "displaying," "establishing," "executing," "facilitating," "filtering," "generating," "grouping," "identifying," "incrementing," "initiating," "interacting," "modifying," "monitoring," "moving," "notifying," "outputting," "performing," "placing," "presenting," "processing," "programming," "providing," "querying," "reading," "removing," "repeating," "sampling," "setting," "sorting," "storing," "subtracting," "tracking," "transforming," "using," "writing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Present Invention

FIG. 1 shows exemplary system 100 for communicating data in accordance with one embodiment of the present invention. As shown in FIG. 1, data signals may be communicated over multiple lanes or paths from component 110 to component 120. The data signals may be separated into multiple bitstreams or packets that are communicated in parallel over the multiple lanes. Accordingly, system 100 may be used to implement multiple lane distribution (MLD), and therefore, be an MLD system in one embodiment. System 100 may be part of or be used to implement at least a portion of an Optical Transmission Network (OTN) in one embodiment.

In one embodiment, skew may develop between data transmitted over two or more of the lanes. The skew may result from the data signals being communicated by different components, a different number of components, etc. As such, data signals transmitted at the same time by component 110 may arrive at different times at component 120.

Figure 2:
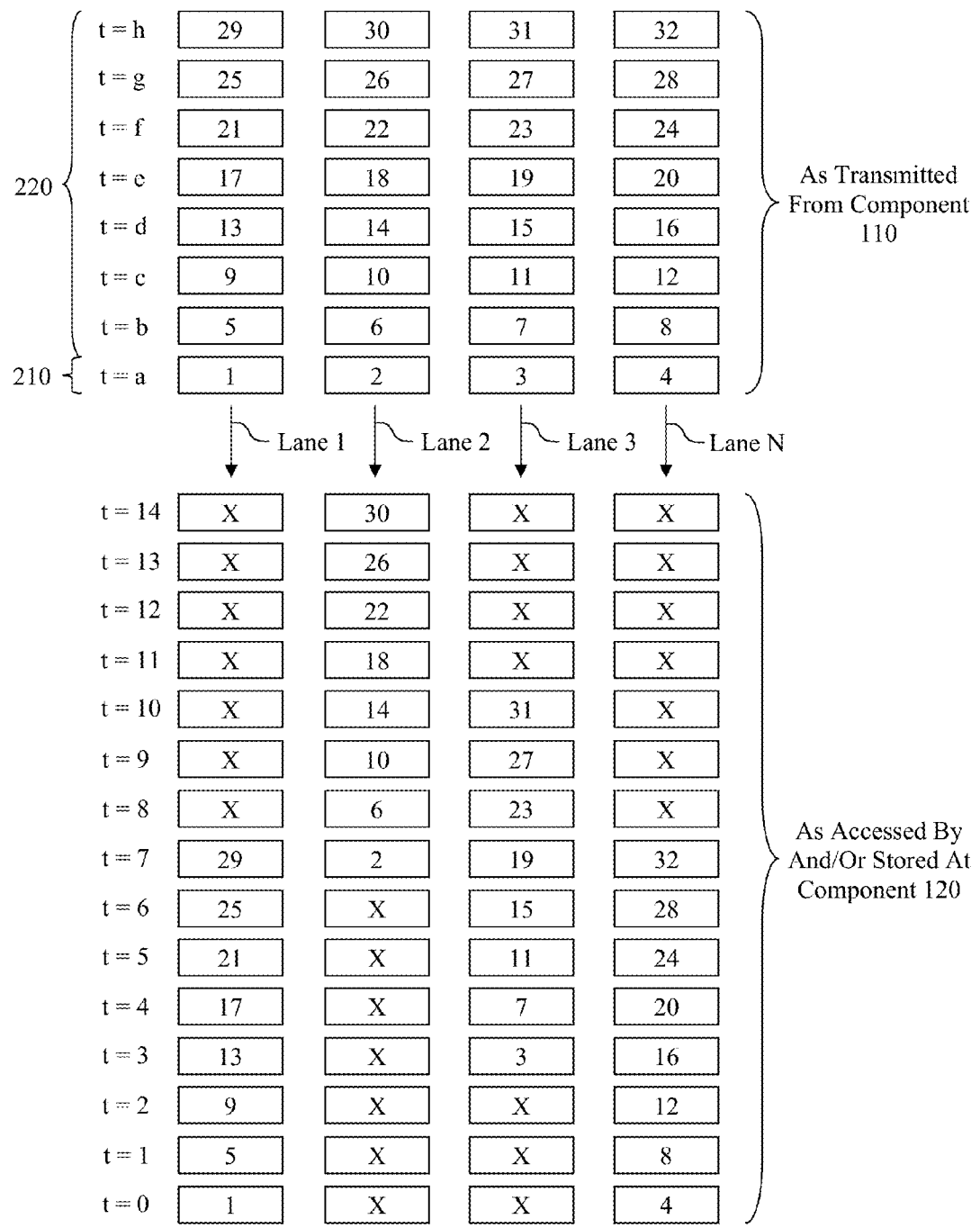
FIG. 2 is an exemplary diagram depicting skew imparted to data as it is communicated from a component to another component in accordance with one embodiment of the present invention.

FIG. 2 is an exemplary diagram depicting skew imparted to data signals as it is communicated from component 110 to component 120 in accordance with one embodiment of the present invention. As shown in FIG. 2, 32 blocks of data may be stored at or otherwise be accessed by component 110. The 32 blocks of data, or some portion thereof, may be associated with a frame (e.g., an OTN frame) in one embodiment. Each block of data may be a word in one embodiment. And in one embodiment, each block of data may be an amount of data read into a memory (e.g., of component 120) and/or written from a memory (e.g., of component 120) in one clock cycle.

As a result of communicating the data from component 110 to component 120, skew may be imparted to the data causing the data to arrive at component 120 at different times. For example, data portion 210 may be transmitted at time t=a from component 110. In one embodiment, each block of data portion 210 (e.g., blocks 1, 2, 3 and 4) may be an "initial portion of data" associated with a unit of data (e.g., a frame of data) since each block is the first block associated with the unit of data to be transmitted from component 110 to component 120 over a respective lane. As shown in FIG. 2, blocks 1 and 4 arrive at component 120 at time t=0 (some time after time t=a), block 2 arrives at component 120 at time t=7, and block 3 arrives at component 120 at time t=3. Accordingly, lane 2 imparts a relative skew of 7 (e.g., compared to lanes 1 and N whose data blocks arrive first) and lane 3 imparts a relative skew of 3 (e.g., compared to lanes 1 and N whose data blocks arrive first). Similar skew is imparted to the other data portions 220 as they are communicated from component 110 to component 120. In this manner, the skewed data arrives at component 120 out of alignment.

In one embodiment, each time depicted in FIG. 2 may represent a clock cycle. Alternatively, each time may represent another unit of time (e.g., an amount of microseconds, an amount of milliseconds, etc.).

Figure 3:
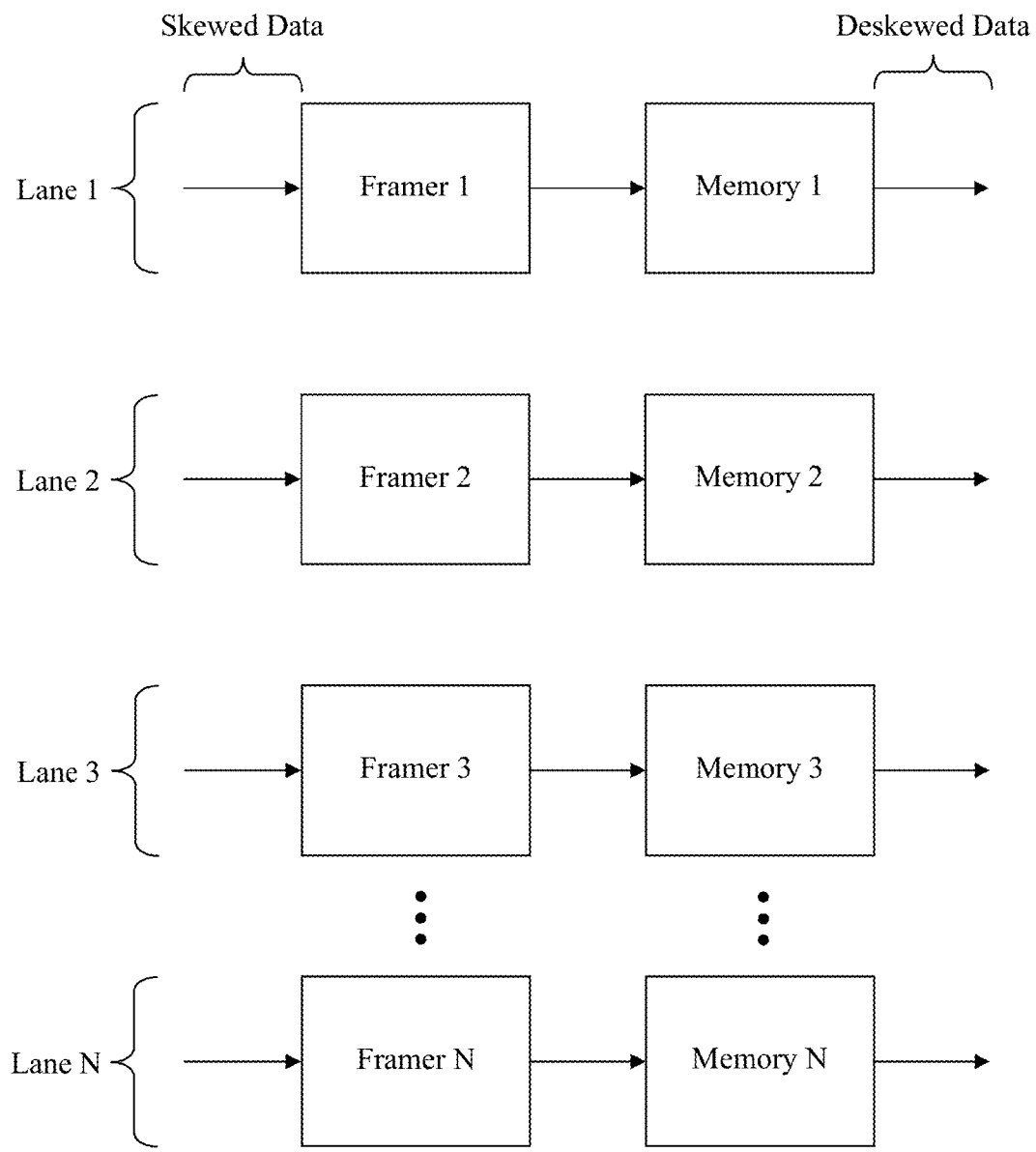
FIG. 3 shows an exemplary component for deskewing the skewed data received over the multiple lanes in accordance with one embodiment of the present invention.

FIG. 3 shows exemplary component 120 for deskewing the skewed data received over the multiple lanes in accordance with one embodiment of the present invention. As shown in FIG. 3, component 120 may include a plurality of framers and a plurality of memories. Each memory may be a respective first-in-first-out (FIFO) buffer in one embodiment, or alternatively, may be another type of memory. Each framer (e.g., a component implemented using hardware and/or software) may receive a respective bitstream communicated over a respective lane, where two or more of the bitstreams may be skewed with respect to one another. The framers may write the data into the memories in an aligned manner (e.g., as depicted in and discussed below with respect to FIGS. 4A, 4B and 4C). In one embodiment, the framers may write the data in an aligned manner into the memories using one or more symbols or signals (e.g., a frame start signal, a frame synchronization signal, etc.) in the data.

Figure 4A:
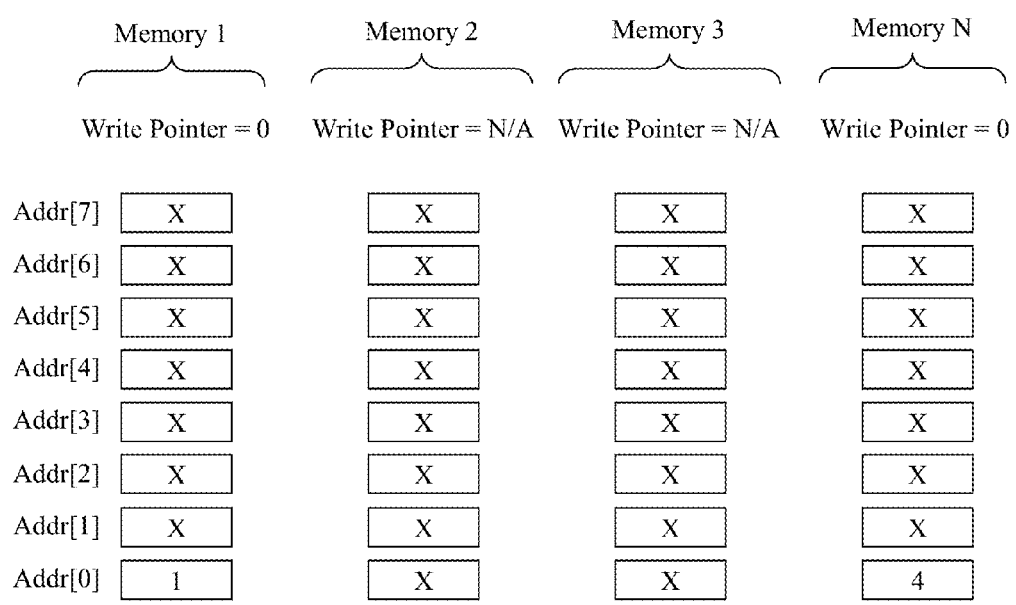
FIG. 4A is a diagram that shows a first exemplary state of memories at a first time as data is written into the memories in an aligned manner in accordance with one embodiment of the present invention.
Figure 4B:
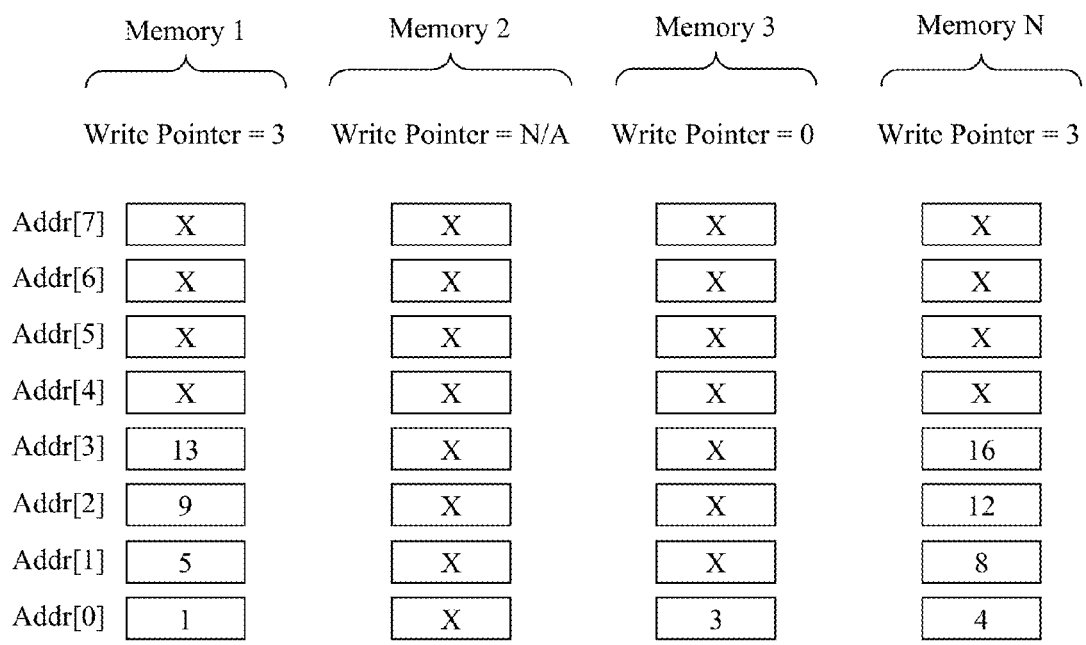
FIG. 4B is a diagram that shows a second exemplary state of memories at a second time as data is written into the memories in an aligned manner in accordance with one embodiment of the present invention.
Figure 4C:
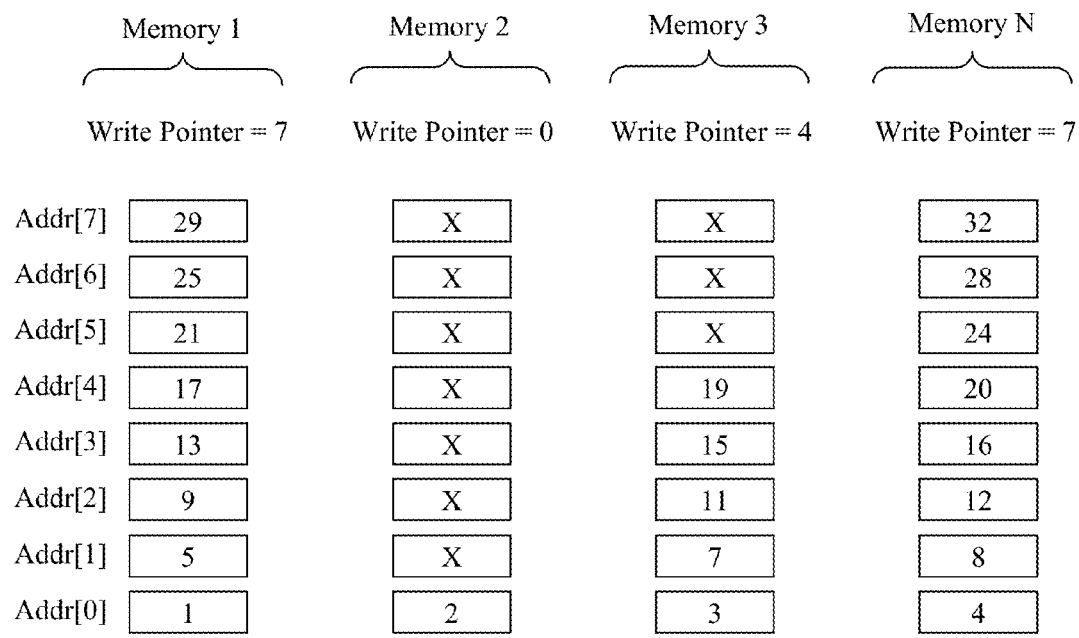
FIG. 4C is a diagram that shows a third exemplary state of memories at a third time as data is written into the memories in an aligned manner in accordance with one embodiment of the present invention.

FIGS. 4A, 4B and 4C are diagrams that show exemplary states of memories at different times as data is written into the memories in an aligned manner in accordance with one embodiment of the present invention. As shown in FIG. 4A, a first set of data blocks (e.g., 1 and 4 associated with a current frame) is written into respective memories (e.g., 1 and N) at a first time (e.g., t=0 as depicted in FIG. 2). The first set of data blocks is written into address addr[0] of respective memories, and therefore, aligned with one another. Other locations in memory have been marked with an "X" to indicate that these blocks are either empty or holding other data (e.g., associated with a previous frame). Other blocks (e.g., 2 and 3 that are also associated with the current frame) have not yet been written into memory at component 120 since they have not yet been received due to the respective skews associated with lanes 2 and 3.

As shown in FIG. 4B, a second set of data blocks (e.g., 13, 3 and 16) is written into respective memories (e.g., 1, 3 and N) at a second time (e.g., t=3 as depicted in FIG. 2). The second set of data blocks is written into one or more addresses to properly align the blocks. For example, blocks 13 and 16 are written to address addr[3] to align them with one another. As another example, block 3 is written to address addr[0] to align it with blocks 1 and 4. Block 2 has not yet been written into memory at component 120 since it has not yet been received due to the skews associated with lane 2. It should be appreciated that one or more blocks (e.g., 5, 8, 9, 12, etc. as shown in FIG. 4B) may be written into one or more memories between the first time (e.g., t=0 as discussed with respect to FIG. 4A) and the second time (e.g., t=3 as discussed with respect to FIG. 4B).

As shown in FIG. 4C, a third set of data blocks (e.g., 29, 2, 19 and 32) is written into respective memories (e.g., 1, 2, 3 and N) at a third time (e.g., t=7 as depicted in FIG. 2). The third set of data blocks is written into one or more addresses to properly align the blocks. For example, blocks 29 and 32 are written to address addr[7] to align them with one another. As another example, block 19 is written to address addr[4] to align it with blocks 17 and 20. And as yet another example, block 2 is written to address addr[0] to align it with blocks 1, 3 and 4. It should be appreciated that one or more blocks (e.g., 7, 11, 15, 17, 20, 21, 24, 24, 28, etc. as shown in FIG. 4C) may be written into one or more memories between the second time (e.g., t=3 as discussed with respect to FIG. 4B) and the second time (e.g., t=7 as discussed with respect to FIG. 4C).

Turning back to FIG. 3, the data stored in the memories in an aligned manner may be contemporaneously read at the same memory location or address in each of the memories. For example, blocks 1, 2, 3 and 4 may be contemporaneously read (e.g., in the same clock cycle) from address addr[0] in each of the memories (e.g., as shown in FIG. 4C). In this manner, the data may be aligned or deskewed by contemporaneously reading the data from the memories in the same alignment as it was originally transmitted with (e.g., as shown in FIG. 2).

The deskewability or deskew tolerance of component 120 may be increased by advantageously determining the last memory (or associated lane) to receive an initial portion of data associated with a frame (e.g., block 1, block 2, block 3, block 4, etc.). For example, memory 2 may be determined to be the last memory to receive an initial portion of data associated with a frame (e.g., block 2) since the other blocks to be aligned with block 2 (e.g., blocks 1, 3 and 4) were received before block 2 (e.g., as shown in FIGS. 4A and 4B). The address at which the initial portion of data (e.g., block 2) is written into memory 2 may be determined using the write pointer associated with memory 2 (e.g., at a value of 0 as shown in FIG. 4C indicating that block 2 was written into memory 2 at address addr[0]). At least one read pointer associated with the memories (e.g., a shared read pointer utilized by all or some of the memories, respective read pointers associated with one or more memories, etc.) may be set to the address (e.g., address addr[0] as determined from the write pointer associated with memory 2) to allow the initial portions of data (e.g., blocks 1, 2, 3 and 4) to be contemporaneously read from the memories. As such, the address at which the last memory or lane receives an initial portion of data associated with a frame may be dynamically determined (e.g., on-the-fly, during runtime or operation of the system or circuit, etc.) and used to read the data from the memories in a deskewed or aligned state, thereby increasing the deskewability or deskew tolerance of the system.

Referring to FIG. 4C as an example, a deskewability of 7 data blocks or clock cycles may be achieved since data with a relative skew of 7 data blocks or clock cycles (e.g., between the data in memories 1 and 2 and/or memories 2 and N) was able to be successfully deskewed. In one embodiment, a deskewability of at least half the depth of the memory (e.g., at least 4 blocks or cycles assuming a memory depth of 8 blocks as shown in FIG. 4C) may be achieved. And in one embodiment, a deskewability of at least the depth of the memory minus one (e.g., at least 7 blocks or cycles assuming a memory depth of 8 blocks as shown in FIG. 4C) may be achieved.

It should be appreciated that the deskewability or deskew tolerance may be expressed in one or more units. For example, it may be expressed in terms of words of data, data blocks, clock cycles, bits (e.g., determined based on a number of bits read and/or written in a clock cycle, a number of bits in a data block or word, etc.), etc.

It should be appreciated that embodiments of the present invention can deskew data with any skew up to the deskewability or deskew tolerance discussed above. For example, although the deskewability and/or deskew tolerance may be at least 7 data blocks or clock cycles, data with a skew of less than 7 data blocks or clock cycles (e.g., 3 data blocks or clock cycles as illustrated by the relative skew between memories 1 and 3 and/or memories 3 and N) may also be successfully deskewed.

In one embodiment, the last memory to receive an initial portion of data may be determined by comparing the value of the write pointers and determining the memory with the write pointer of the lowest value. For example, as shown in FIG. 4C, memory 2 has the write pointer with the lowest value (e.g., zero which is lower than 4 and 7 of the write pointers associated with other memories and lanes). As such, the write pointers may be repurposed to function as counters indicating a number of blocks associated with a frame that have been written into each memory (e.g., in addition to indicating the address at which the last block has been written to).

In one embodiment, each writer pointer may be initialized or reset (e.g., to zero or any other value corresponding to a location that the initial portions of data should be written to) responsive to accessing an initial portion of data (e.g., associated with a frame) or responsive to writing an initial portion of data (e.g., associated with a frame) to a respective memory. In this manner, the write pointers may be initialized or reset at different times where initial portions of data are written into the memories at different times (e.g., due to skew between the data received at different memories). Although the value of the write pointers before initialization have been labeled "N/A" in FIGS. 4A and 4B to indicate that the write pointers have not yet been initialized for the current set of data (e.g., the current frame), it should be appreciated that the value of one or more of the write pointers may be associated with an address in memory at which other data (e.g., associated with a previous frame) has previously been written.

In one embodiment, the last memory to receive an initial portion of data may be determined based on the value of the write pointers in combination with the value of a respective flag associated with each memory or lane. A flag associated with a memory may be set or incremented responsive to or contemporaneously with a write pointer associated with the memory reaching a maximum value (e.g., 7 in the case of a memory with a depth of 8 blocks). Each flag may be initialized or reset contemporaneously with the initialization or resetting of a corresponding write pointer (e.g., responsive to accessing an initial portion of data or responsive to writing an initial portion of data to a respective memory) in one embodiment. As such, any write pointers associated with flags that have been set or incremented may be ignored or excluded when comparing the values of the write pointers to determine the last memory to receive an initial portion of data (e.g., associated with a frame), thereby allowing the write pointers to properly indicate the last memory to receive an initial portion of data in situations where data is written into the memories in a circular fashion and/or where the initial location for writing the initial portions of data is an address other than addr[0] (e.g., as depicted in FIGS. 5A, 5B, 5C, 5D and 5E).

FIGS. 5A, 5B, 5C, 5D and 5E are diagrams that show exemplary states of memories at subsequent times as data is written into the memories in an aligned manner and in a circular fashion in accordance with one embodiment of the present invention. Although the same block numbers are used in FIGS. 5A, 5B, 5C, 5D and 5E as in previous Figures (e.g., FIGS. 2, 4A, 4B and 4C), the arrival of the blocks is different as the skews between the data received by each memory have been changed (e.g., with respect to the skews illustrated in FIGS. 2, 4A, 4B and 4C). Accordingly, it should be appreciated that although a skew of only 4 blocks or clock cycles is illustrated in FIGS. 5A through 5E as will be explained, it should be appreciated that embodiments of the present invention can successfully deskew data that is written into the memories in a circular fashion with a smaller or larger amount of skew (e.g., at least 7 data blocks or clock cycles, fewer than 7 data blocks or clock cycles, etc.).

Figure 5A:
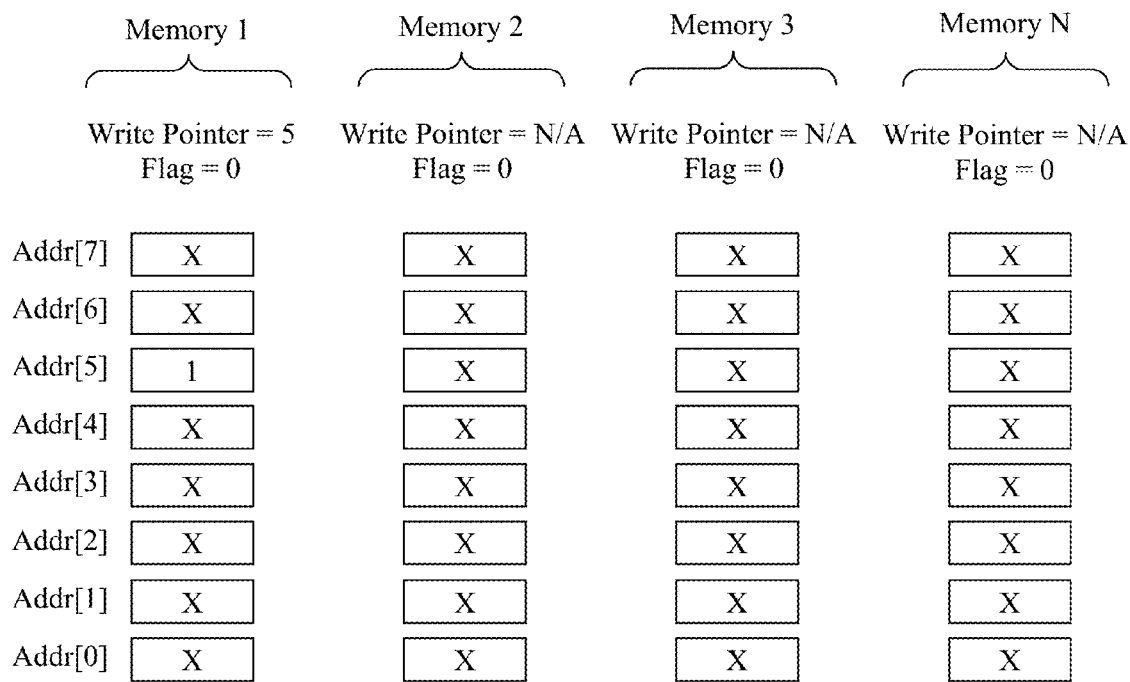
FIG. 5A is a diagram that shows a first exemplary state of memories at a first time as data is written into the memories in an aligned manner and in a circular fashion in accordance with one embodiment of the present invention.

As shown in FIG. 5A, block 1 is written into memory 1 at address addr[5] at a first time. Other locations in memory have been marked with an "X" to indicate that these blocks are either empty or holding other data (e.g., associated with a previous frame). Other blocks (e.g., 2, 3 and 4 that are also associated with the current frame) have not yet been written into memory at component 120 since they have not yet been received due to the respective skews associated with lanes 2, 3 and 4.

Figure 5B:
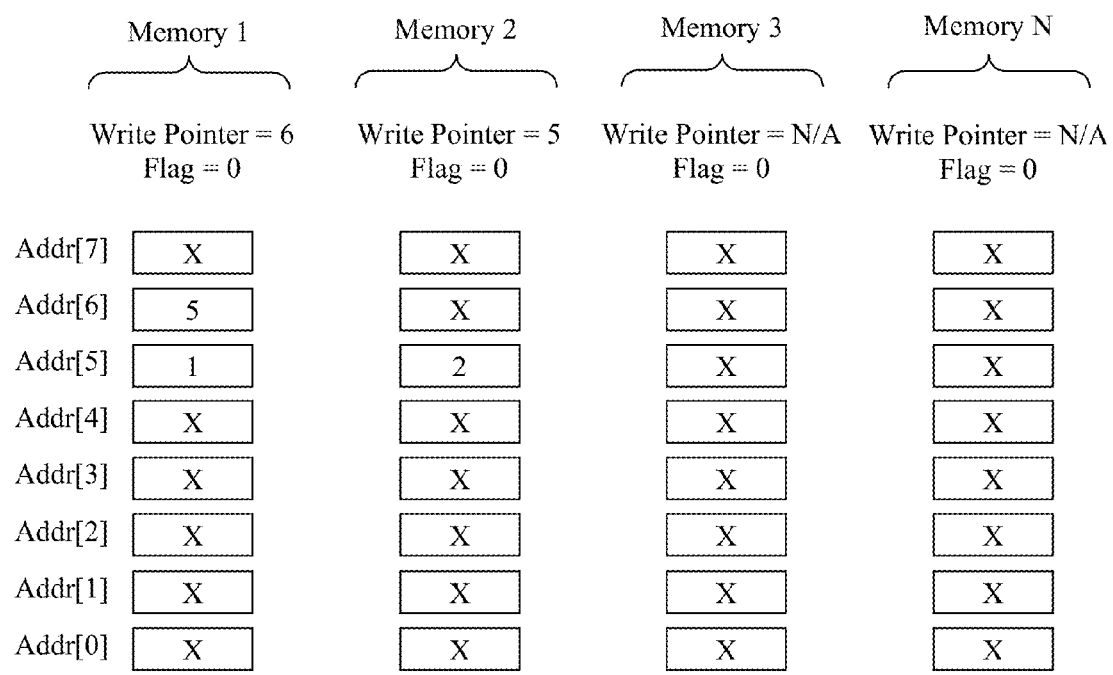
FIG. 5B is a diagram that shows a second exemplary state of memories at a second time as data is written into the memories in an aligned manner and in a circular fashion in accordance with one embodiment of the present invention.

As shown in FIG. 5B, block 2 is written into memory 2 at address addr[5] at a second time, thereby aligning blocks 1 and 2. The second time associated with FIG. 5B may be one clock cycle later than the first time associated with FIG. 5A in one embodiment. At the second time, block 5 is written into memory 1 at address addr[6].

Figure 5C:
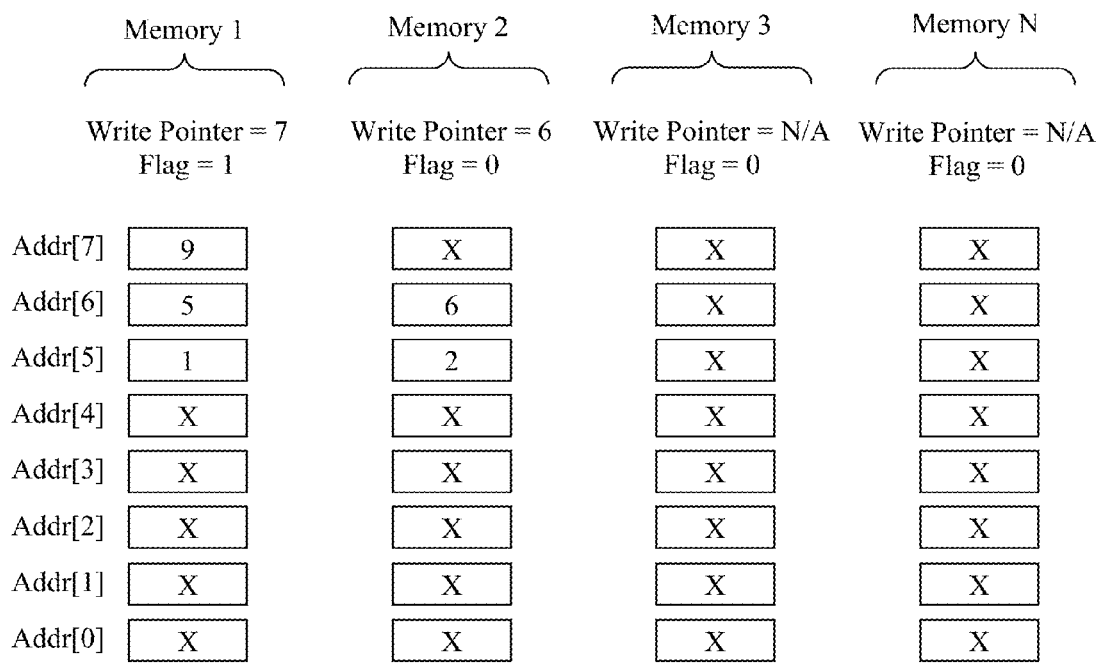
FIG. 5C is a diagram that shows a third exemplary state of memories at a third time as data is written into the memories in an aligned manner and in a circular fashion in accordance with one embodiment of the present invention.

As shown in FIG. 5C, block 6 is written into memory 2 at address addr[6] at a third time, thereby aligning blocks 5 and 6. The third time associated with FIG. 5C may be one clock cycle later than the second time associated with FIG. 5B in one embodiment. At the third time, block 9 is written into memory 1 at address addr[7], thereby causing the write pointer associated with memory 1 to reach the maximum value of 7 and also causing the flag associated with memory 1 to be set or incremented.

Figure 5D:
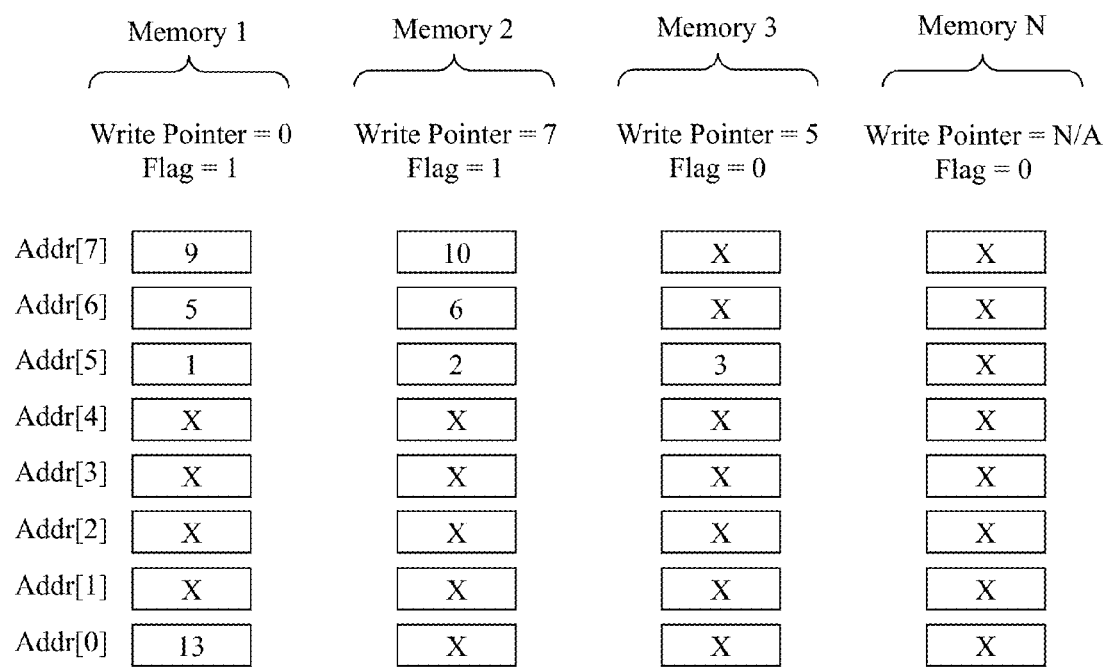
FIG. 5D is a diagram that shows a fourth exemplary state of memories at a fourth time as data is written into the memories in an aligned manner and in a circular fashion in accordance with one embodiment of the present invention.

As shown in FIG. 5D, block 3 is written into memory 3 at address addr[5] at a fourth time, thereby aligning blocks 1, 2 and 3. The fourth time associated with FIG. 5D may be one clock cycle later than the third time associated with FIG. 5C in one embodiment. At the fourth time, block 10 is written into memory 2 at address addr[7], thereby aligning blocks 9 and 10. Additionally, the write pointer associated with memory 2 may be incremented to the maximum value of 7 and the flag associated with memory 2 may be set or incremented.

Also at the fourth time, block 13 may be written into memory 1 at address addr[0]. The write pointer associated with memory 1 may be changed to 0 as block 13 is written into the first location (e.g., at addr[0]) after block 9 was written to the last location (e.g., at addr[7]), thereby illustrating writing of data to memory 1 in a circular fashion. The flag associated with memory 1 remains set or at the same value (e.g., 1) to indicate that the writing of data in memory 1 has switched from one end of memory 1 to the other.

Figure 5E:
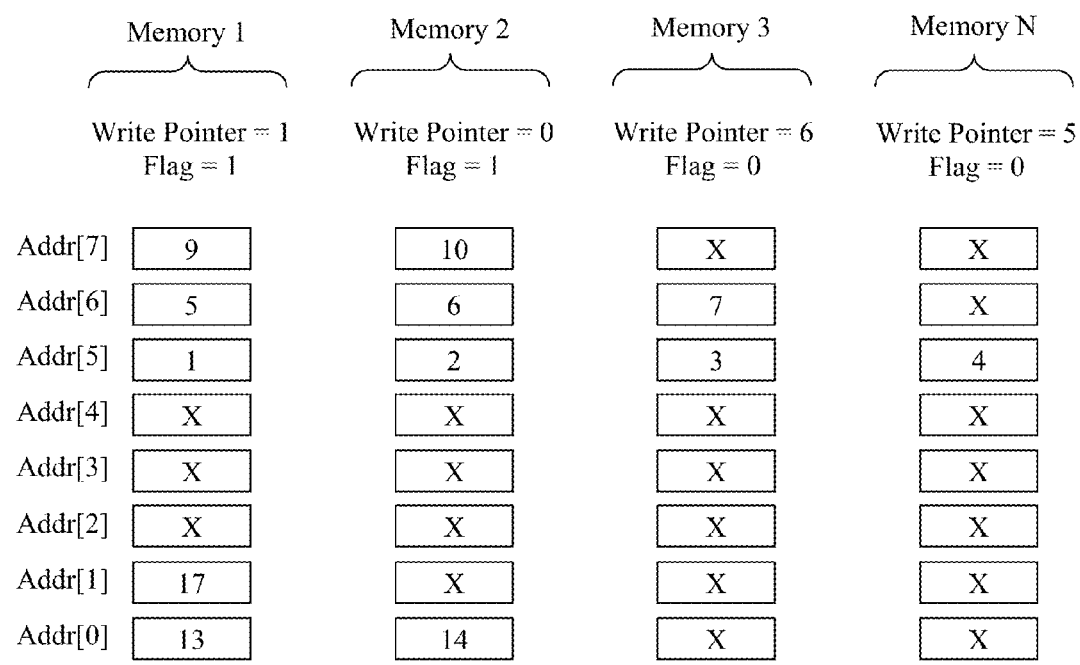
FIG. 5E is a diagram that shows a fifth exemplary state of memories at a fifth time as data is written into the memories in an aligned manner and in a circular fashion in accordance with one embodiment of the present invention.

As shown in FIG. 5E, block 4 is written into memory N at address addr[5] at a fifth time, thereby aligning blocks 1, 2, 3 and 4. The fifth time associated with FIG. 5E may be one clock cycle later than the fourth time associated with FIG. 5D in one embodiment. Block 7 is written into memory 3 at address addr[6] at the fifth time, thereby aligning blocks 5, 6 and 7. Additionally, block 17 is written into memory 1 at address addr[1] at the fifth time.

Also at the fifth time, block 14 may be written into memory 2 at address addr[0]. The write pointer associated with memory 2 may be changed to 0 as block 14 is written into the first location (e.g., at addr[0]) after block 10 was written to the last location (e.g., at addr[7]), thereby illustrating writing of data to memory 2 in a circular fashion. The flag associated with memory 2 remains set or at the same value (e.g., 1) to indicate that the writing of data in memory 2 has switched from one end of memory 1 to the other.

In one embodiment, the flags may be used to determine when to perform a comparison of the write pointers and/or flags (e.g., used to determined the last memory or lane to receive an initial portion of data). For example, the comparison of write pointer values and/or flag values (e.g., used to determined the last memory or lane to receive an initial portion of data) may be performed responsive to the incrementing or setting of a predetermined flag (e.g., associated with memory 1, memory 2, memory 3, memory N, etc.). The predetermined flag may be selected or determined automatically and/or manually (e.g., by a user). The predetermined flag may be selected or determined before runtime or operation of component 120 or a component thereof. Alternatively, the predetermined flag may be selected or determined dynamically or on-the-fly, etc.

Embodiments of the present invention may determine that memory N is the last memory to receive an initial portion of data (e.g., block 1, block 2, block 3, block 4, etc.) associated with the current frame based on the write pointers and the flags associated with the memories. For example, a comparison of the values of the write pointers may be performed (e.g., responsive to the incrementing or setting a predetermined flag, responsive to the incrementing of a predetermined write pointer, at another time, etc.), where the lowest value may indicate the last memory to receive an initial portion of data. Additionally, any write pointers associated with a flag that has been set or incremented (e.g., the write pointers associated with memories 1 and 2) may be ignored or excluded from the comparison as the values of these write pointers may be artificially low (e.g., 1 and 0, respectively) given the writing of data has wrapped from one end of the memories to the other. As such, the comparison may involve comparing the values of the write pointers associated with memory 3 (e.g., 6) and memory N (e.g., 5) to determine the write pointer with the lowest value (e.g., the write pointer associated with memory N), thereby indicating that memory N is the last memory to receive initial data associated with the current frame. Thereafter, data associated with the current frame may be contemporaneously read from the same location in each of the memories (e.g., starting at address addr[5]) as discussed with respect to the previous figures to successfully deskew the data.

Turning back to FIGS. 1 and 3, component 120 may be implemented using a programmable logic device (e.g., PLD 800 of FIG. 8) in one embodiment. One or more components of component 120 (e.g., at least one of the framers, at least one of the memories, at least one write pointer, at least one read pointer, at least one flag, etc.) may be implemented using a reconfigurable portion of the PLD (e.g., the "fabric," etc.), a portion of the PLD that is not reconfigurable (e.g., the "hard IP," etc.), or some combination thereof.

Although FIG. 1 shows a specific number of components (e.g., component 110, component 120, lanes 1 through N, etc.), it should be appreciated that system 100 may include a larger or smaller number of components in other embodiments. Additionally, although FIG. 1 shows a specific arrangement of components (e.g., component 110 communicating data to component 120), it should be appreciated that the components of system 100 may be alternatively arranged in other embodiments.

Although FIG. 3 shows component 120 with a specific number of components (e.g., framers, memories, etc.), it should be appreciated that component 120 may include a larger or smaller number of components in other embodiments. Additionally, although FIG. 3 shows component 120 with a specific arrangement of components, it should be appreciated that the components of component 120 may be alternatively arranged in other embodiments.

Although the other previously-described Figures (e.g., FIG. 2, FIG. 4A, FIG. 4B, FIG. 4C, FIG. 5A, FIG. 5B, FIG. 5C, FIG. 5D, and FIG. 5E) show a specific number of memory blocks (e.g., within each memory of component 120, within each memory of component 110, etc.), it should be appreciated that a larger or smaller number of memory blocks may be used in other embodiments. Additionally, although the other previously-described Figures (e.g., FIG. 2, FIG. 4A, FIG. 4B, FIG. 4C, FIG. 5A, FIG. 5B, FIG. 5C, FIG. 5D, and FIG. 5E) show a specific arrangement of memory blocks (e.g., within each memory of component 120, within each memory of component 110, etc.), it should be appreciated that the memory blocks may be alternatively arranged in other embodiments.

Figure 6:
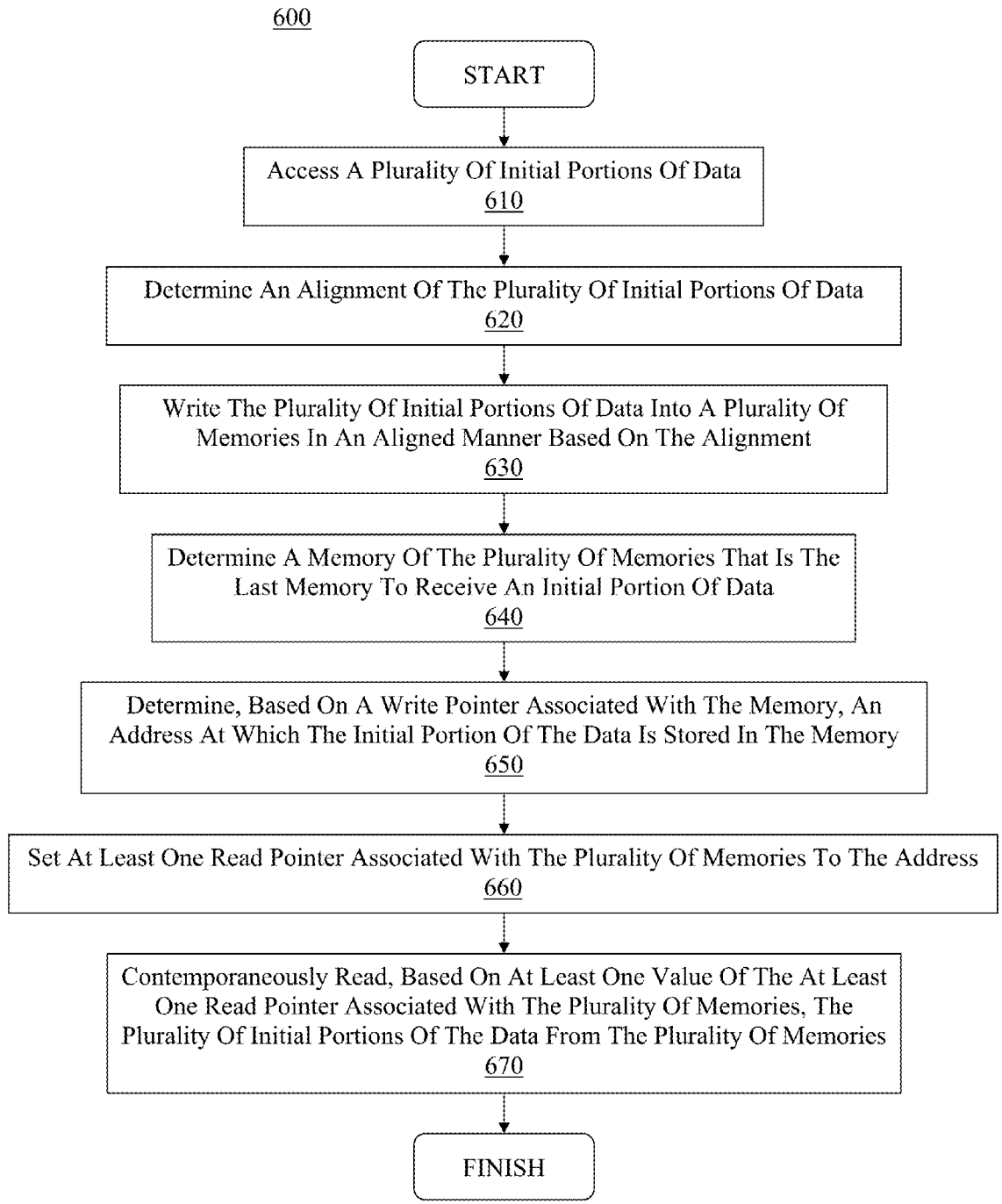
FIG. 6 shows a flowchart of an exemplary computer-implemented process for deskewing data in accordance with one embodiment of the present invention.

FIG. 6 shows a flowchart of exemplary computer-implemented process 600 for deskewing data in accordance with one embodiment of the present invention. As shown in FIG. 6, step 610 involves accessing a plurality of initial portions of data (e.g., associated with the same frame of data). In one embodiment, step 610 may involve receiving a plurality of initial portions of data (e.g., block 1, block 2, block 3 and block 4) at a receiving component (e.g., 120) and/or accessing the plurality of initial portions of data using at least one component (e.g., one or more framers) of the receiving component (e.g., 120). The plurality of initial portions of data may be received at a first plurality of times (e.g., blocks 1 and 4 may be received at time t=0 as shown in FIG. 2, block 3 may be received at time t=3 as shown in FIG. 2, and block 2 may be received at time t=7 as shown in FIG. 2) in one embodiment.

Step 620 involves determining an alignment of the plurality of initial portions of data (e.g., accessed in step 610). The alignment of the plurality of initial portions of data may be determined in step 620 by at least one component (e.g., one or more framers) of a component receiving the plurality of initial portions of data (e.g., component 120). The alignment may be determined in step 620 using one or more symbols or signals (e.g., a frame start signal, a frame synchronization signal, etc.) in the plurality of initial portions of data.

As shown in FIG. 6, step 630 involves writing the plurality of initial portions of data into a plurality of memories (e.g., of component 120) in an aligned manner based on the alignment (e.g., determined in step 620). Each of the plurality of initial portions of data may be written into a respective memory of the plurality of memories in step 630. In one embodiment, step 630 may involve writing the plurality of initial portions of data into a plurality of memories in accordance with FIGS. 4A, 4B and 4C. And in one embodiment, step 630 may involve writing the plurality of initial portions of data into a plurality of memories in accordance with FIGS. 5A, 5B, 5C, 5D and 5E.

In embodiment, each of the memories of the plurality of memories may be a respective FIFO buffer. And in one embodiment, each of the memories of the plurality of memories may be associated with a respective write pointer (e.g., as shown and described with respect to FIGS. 4A, 4B, 4C, 5A, 5B, 5C, 5D, 5E, etc.).

Step 640 involves determining a memory of the plurality of memories that is the last memory to receive an initial portion of data (e.g., associated with a given frame). For example, step 640 may involve determining that memory 2 is the last memory to receive an initial portion of data (e.g., block 2) as shown in FIG. 4C and described with respect to FIGS. 4A, 4B and 4C. As another example, step 640 may involve determining that memory N is the last memory to receive an initial portion of data (e.g., block 4) as shown in FIG. 5E and described with respect to FIGS. 5A, 5B, 5C, 5D and 5E.

In one embodiment, step 640 may be performed after or responsive to receiving all of the plurality of initial portions of data (e.g., blocks 1, 2, 3 and 4) and/or responsive to writing all of the plurality of initial portions of data (e.g., blocks 1, 2, 3 and 4) into their respective memories. And in one embodiment, step 640 may be performed in accordance with one or more steps of process 700 of FIG. 7.

Figure 7:
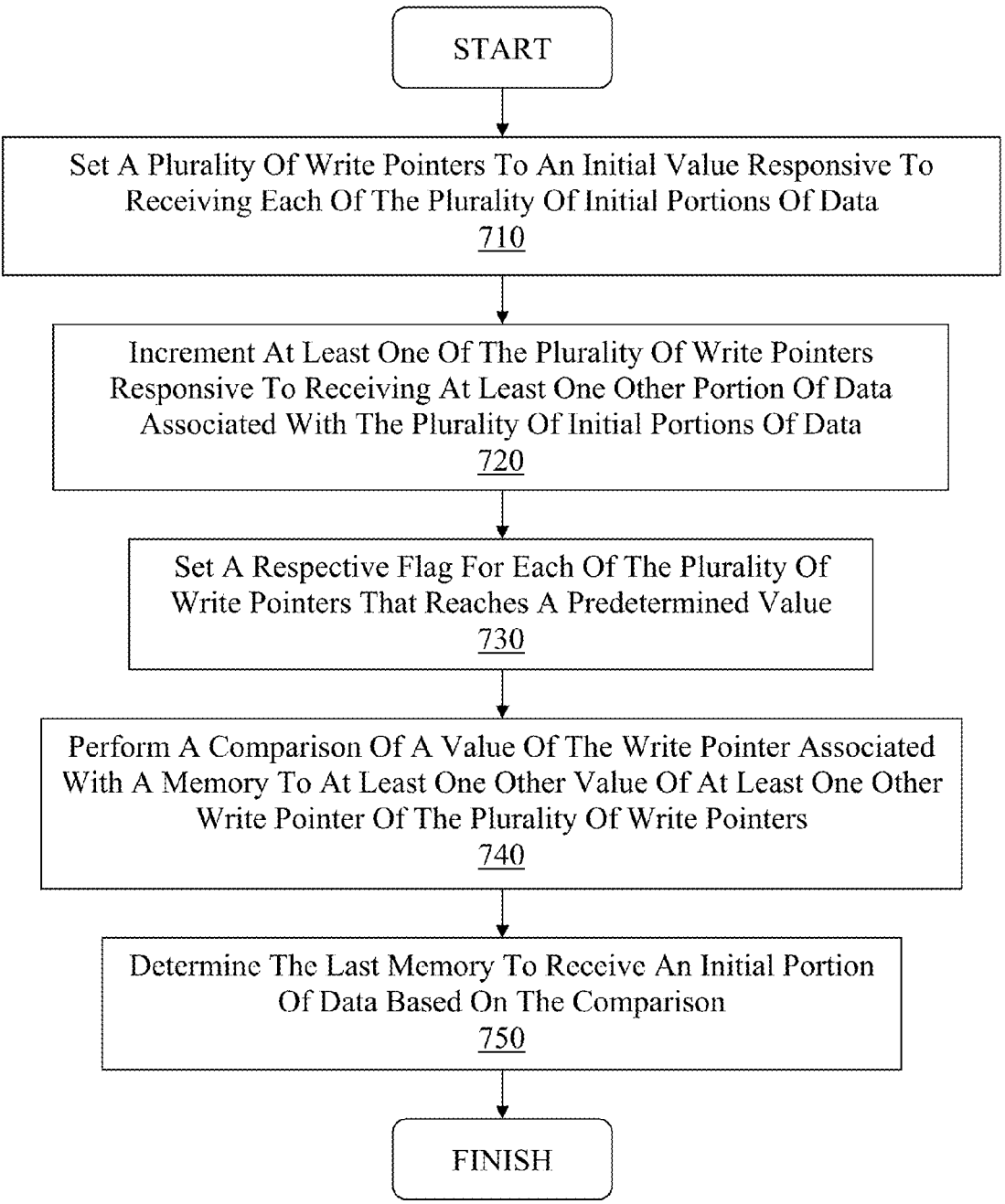
FIG. 7 shows a flowchart of an exemplary computer-implemented process for determining a memory of a plurality of memories that is the last memory to receive an initial portion of data in accordance with one embodiment of the present invention.

FIG. 7 shows a flowchart of exemplary computer-implemented process 700 for determining a memory of a plurality of memories that is the last memory to receive an initial portion of data in accordance with one embodiment of the present invention. As shown in FIG. 7, step 710 involves setting a plurality of write pointers (e.g., associated with the plurality of memories) to an initial value (e.g., a predetermined value or a value determined before runtime or operation of component 120 or a component thereof, a value determined dynamically or on-the-fly, etc.). In one embodiment, step 710 may involve setting the plurality of write pointers to an initial value responsive to receiving each initial portion of data of the plurality of initial portions of data (e.g., but prior to writing each of the plurality of initial portions of data into memory). Step 710 may involve initializing or setting the plurality of write pointers to the initial value (e.g., indicating an address or portion of the memories at which the plurality of initial portions of data is to be written) at a plurality of different times where the plurality of initial portions of data are received (e.g., at component 120) at different times due to skew between the plurality of initial portions of data.

In one embodiment, step 710 may also involve initializing or resetting one or more flags associated with the plurality of memories. Each memory of the plurality of memories may be associated with a respective flag in one embodiment.

As shown in FIG. 7, step 720 involves incrementing at least one of the plurality of write pointers responsive to receiving at least one other portion of data associated with at least one of the plurality of initial portions of data. The at least one other portion of data and the plurality of initial portions of data may be associated with the same frame of data in one embodiment. Taking the arrangement of data as shown in FIG. 4B, the write pointer associated with memory 1 may be incremented in step 720 from zero to one responsive to receiving at least one other portion of data (e.g., block 5) associated with at least one of the plurality of initial portions of data (e.g., block 1).

Step 730 involves setting a respective flag for each of the plurality of write pointers that reaches a predetermined value. The predetermined value may be a maximum value (e.g., seven as shown in FIGS. 4A, 4B, 4C, 5A, 5B, 5C, 5D and 5E) or some other value. For example, as shown in FIG. 5C, the flag associated with memory 1 may be set or incremented responsive to the write pointer associated with memory 1 being incremented to a predetermined value (e.g., seven) and/or responsive to a writing of data (e.g., block 9) at an address (e.g., addr[7]) associated with the predetermined value.

As shown in FIG. 7, step 740 involves performing a comparison of a value of the write pointer (e.g., incremented in step 720) associated with a memory to at least one other value of at least one other write pointer of the plurality of write pointers. The comparison may indicate at least one memory having the lowest write pointer value in one embodiment. For example, step 740 may involve comparing the write pointers of all memories where there are no flags associated with the memories or otherwise used. As another example, step 740 may involve comparing the write pointers of all memories where there are no flags that are set or incremented (e.g., all flags associated with the plurality of memories are at an initial value or not set) or where all the flags are set or incremented.

In one embodiment, step 740 may be performed responsive to the incrementing or setting of a predetermined flag. For example, the comparison of write pointer values and/or flag values (e.g., performed in step 740) may be performed responsive to the incrementing or setting of a predetermined flag (e.g., associated with memory 1, memory 2, memory 3, memory N, etc.). The predetermined flag may be selected or determined automatically and/or manually (e.g., by a user). The predetermined flag may be selected or determined before runtime or operation of component 120 or a component thereof. Alternatively, the predetermined flag may be selected or determined dynamically or on-the-fly, etc.

In one embodiment, if at least one flag is set and at least one flag is not set, then any values of any write pointers associated with a set flag may be ignored or excluded from the comparison performed in step 740. For example, the values of the write pointers associated with memories 1 and 2 as shown in FIG. 5E may be ignored or excluded and only the values of the write pointers associated with memories 3 and N may be used in the comparison performed in step 740. In this manner, values of write pointers associated with memories in which data has been written in a circular fashion from one end of the memories to the other may be advantageously excluded, thereby improving the results of the determination of the last memory to receive an initial portion of data in step 750.

As shown in FIG. 7, step 750 involves determining the last memory to receive an initial portion of data based on the comparison (e.g., performed in step 740). For example, if the comparison indicates that write pointer of memory 2 has the lowest value (e.g., as shown in FIG. 4C), then memory 2 may be determined in step 750 as the last memory to receive an initial portion of data (e.g., block 2 at address addr[0]). As another example, if the comparison indicates that write pointer of memory N has the lowest value (e.g., as shown in FIG. 5E with the write pointer values for memories 1 and 2 excluded since the flags associated with memories 1 and 2 are set), then memory N may be determined in step 750 as the last memory to receive an initial portion of data (e.g., block 4 at address addr[5]).

Turning back to FIG. 6, step 650 involves determining, based on a write pointer associated with the memory (the last memory to receive an initial portion of data as determined in step 640), an address at which the initial portion of data is stored in the memory. For example, where memory 2 is determined to be the last memory to receive an initial portion of data (e.g., as shown in FIG. 4C), then address addr[0] may be determined in step 650 as the address at which the initial portion of data is stored in the memory (e.g., based on the value of the write pointer associated with memory 2 as shown in FIG. 4C). As another example, where memory N is determined to be the last memory to receive an initial portion of data (e.g., as shown in FIG. 5E), then address addr[5] may be determined in step 650 as the address at which the initial portion of data is stored in the memory (e.g., based on the value of the write pointer associated with memory N as shown in FIG. 5E).

Step 660 involves setting at least one read pointer associated with the plurality of memories to the address (e.g., determined in step 650). The at least one read pointer set in step 660 may be a shared read pointer utilized by all or some of the memories or respective read pointers associated with one or more memories.

As shown in FIG. 6, step 670 involves contemporaneously reading, based on at least one value of the at least one read pointer (e.g., set in step 660) associated with the plurality of memories, the plurality of initial portions of the data from the plurality of memories. The plurality of initial portions of the data may be read from the plurality of memories in step 670 in a deskewed or aligned manner (e.g., as the data was originally aligned before transmission from component 110 to component 120). And in one embodiment, the plurality of initial portions of the data may be read from the plurality of memories in step 670 in or at the same clock cycle.

Accordingly, the address at which the last memory or lane receives an initial portion of data (e.g., associated with a frame) may be dynamically determined (e.g., on-the-fly, during runtime or operation of the system or circuit, etc.). The address may then be used to read the data (e.g., the initial portions of data, subsequent portions of data associated with the initial portions of data, etc.) from the memories in a deskewed or aligned state, thereby increasing the deskewability or deskew tolerance of the system.

Programmable Logic Device

Figure 8:
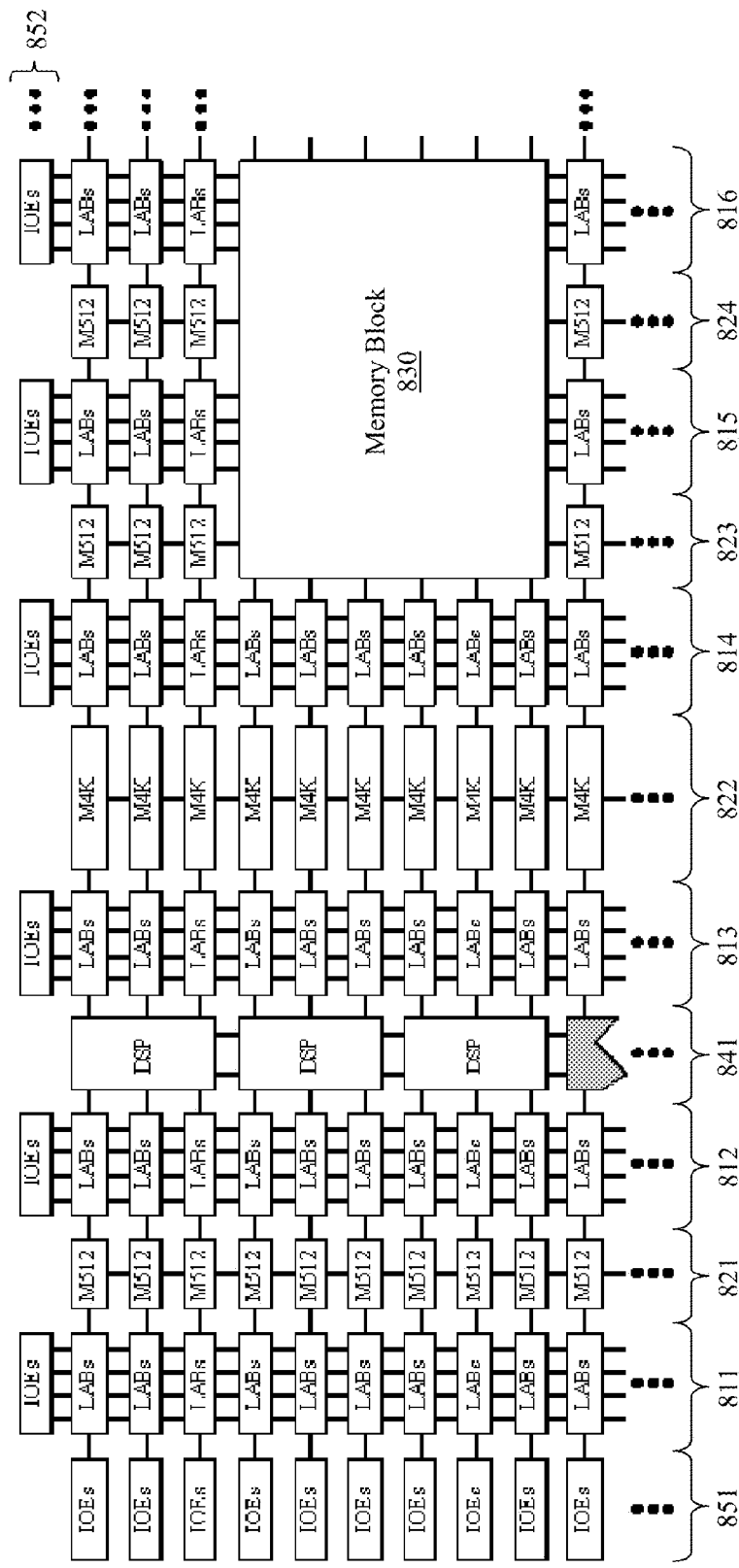
FIG. 8 shows an exemplary programmable logic device (PLD) that can be used to implement one or more components of one or more embodiments of the present invention.

FIG. 8 shows exemplary programmable logic device (PLD) 800 that can be used to implement one or more components of one or more embodiments of the present invention. For instance, PLD 800 may be used to implement component 110, component 120, another component, some combination thereof, etc. In one embodiment, PLD 800 of FIG. 8 may be used to implement a field programmable gate array (FPGA), a complex programmable logic device (CPLD), a programmable logic arrays (PLA), or some other type of programmable logic device.

As shown in FIG. 8, PLD 800 may include a plurality of programmable logic array blocks (LABs). The LABs of PLD 800 may be arranged in rows and/or columns (e.g., as two-dimensional arrays) in one embodiment. For example, columns 811, 812, 813, 814, 815 and 816 may include one or more LABs. In one embodiment, the LABs may be interconnected by a network of column interconnect conductors and/or row interconnect conductors.

Each LAB may include logic that can be configured to implement one or more user-defined logic functions. For example, the interconnect structure of a LAB may be programmed to interconnect the components of the LAB in one or more desired configurations. A LAB may include at least one look-up table (LUT), at least one register, at least one multiplexer, some combination thereof, etc. In one embodiment, the logic may be organized into a plurality of logic elements (LEs), where the interconnection of the LEs can be programmed to vary the functionality of the LAB. And in one embodiment, each LAB may implement or form at least one logic element cluster, where each logic element cluster includes one or more respective LEs.

As shown in FIG. 8, PLD 800 may include a plurality of memory blocks (e.g., memory block 830, memory blocks in columns 821, 822, 823, 824, etc.). In one embodiment, a memory block may include random access memory (RAM), where the RAM may be used to provide multi-port memory, dedicated true dual-port memory, simple dual-port memory, single-port memory, or some combination thereof. And in one embodiment, a memory block may include at least one shift register, at least one first-in-first-out (FIFO) buffer, at least one flip-flop, some combination thereof, etc.

The memory blocks of PLD 800 may be arranged in rows and/or columns (e.g., as two-dimensional arrays) in one embodiment. For example, columns 821, 822, 823 and 824 may include one or more memory blocks. Alternatively, one or more memory blocks (e.g., 830) may be located individually or in small groups (e.g., of two memory blocks, three memory blocks, etc.) in the PLD.

As shown in FIG. 8, PLD 800 may include a plurality of digital signal processing (DSP) blocks. The DSP blocks may provide digital signal processing functions such as FIR filtering, infinite impulse response (IIR) filtering, image processing, modulation (e.g., equalization, etc.), encryption, error correction, etc. The DSP blocks may offer other functionality such as accumulation, addition/subtraction, summation, etc.

PLD 800 may include a plurality of input/output elements (IOEs). Each IOE may include at least one input buffer and/or at least one output buffer coupled to one or more pins of the PLD, where the pins may be external terminals separate from the die of the PLD. In one embodiment, an IOE may be used to communicate input signals, output signals, supply voltages, etc. between other components of the PLD and one or more external devices (e.g., separate form the PLD). In one embodiment, the IOEs may be located at end of the rows and columns of the LABs around the periphery of PLD 800 (e.g., in column 851, in row 852, etc.).

In one embodiment, PLD 800 may include routing resources. For example, PLD 800 may include LAB local interconnect lines, row interconnect lines (e.g., "H-type wires"), column interconnect lines (e.g., "V-type wires"), etc. that may be used to route signals between components of PLD 800. The routing resources may be configurable or programmable (e.g., by a user, based on a user design or function, etc.) in one embodiment.

And in one embodiment, PLD 800 may include or otherwise implement at least one processor and at least one memory. The at least one memory may be a computer-readable medium or computer-usable medium in one embodiment, where the at least one memory may include instructions that when executed by the at least one processor may implement a method of deskewing data (e.g., in accordance with process 600 of FIG. 6), a method of determining a memory of a plurality of memories that is the last memory to receive an initial portion of data (e.g., in accordance with process 700 of FIG. 7), some combination thereof, etc.

Computer System Platform

Figure 9:
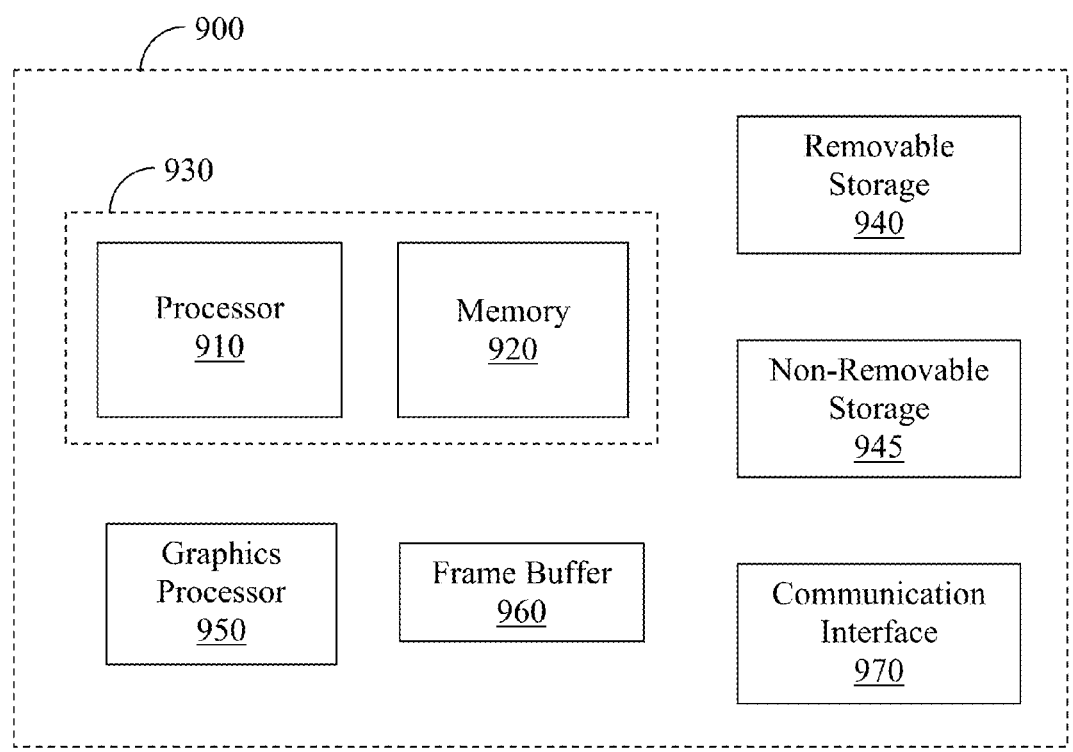
FIG. 9 shows an exemplary computer system platform upon which embodiments of the present invention may be implemented.

FIG. 9 shows exemplary computer system platform 900 upon which embodiments of the present invention may be implemented. As shown in FIG. 9, portions of the present invention may be implemented by execution of computer-readable instructions or computer-executable instructions that may reside in components of computer system platform 900 and which may be used as a part of a general purpose computer network. It is appreciated that computer system platform 900 of FIG. 9 is merely exemplary. As such, the present invention can operate within a number of different systems including, but not limited to, general-purpose computer systems, embedded computer systems, laptop computer systems, hand-held computer systems, portable computer systems, or stand-alone computer systems.

In one embodiment, computer system platform 900 may be used to implement component 110, component 120, another component, some combination thereof, etc. And in one embodiment, one or more components of computer system platform 900 may be disposed in and/or coupled with a housing or enclosure.

In one embodiment, depicted by dashed lines 930, computer system platform 900 may include at least one processor 910 and at least one memory 920. Processor 910 may include a central processing unit (CPU) or other type of processor. Depending on the configuration and/or type of computer system environment, memory 920 may include volatile memory (e.g., RAM), non-volatile memory (e.g., ROM, flash memory, etc.), or some combination of the two. Additionally, memory 920 may be removable, non-removable, etc.

In other embodiments, computer system platform 900 may include additional storage (e.g., removable storage 940, non-removable storage 945, etc.). Removable storage 940 and/or non-removable storage 945 may include volatile memory, non-volatile memory, or any combination thereof. Additionally, removable storage 940 and/or non-removable storage 945 may include CD-ROM, digital versatile disks (DVD) or other optical storage, magnetic cassettes, magnetic tape, magnetic disk storage or other magnetic storage devices, or any other medium which can be used to store information for access by computer system platform 900.

As shown in FIG. 9, computer system platform 900 may communicate with other systems, components, or devices via communication interface 970. Communication interface 970 may embody computer-readable instructions, data structures, program modules or other data in a modulated data signal (e.g., a carrier wave) or other transport mechanism. By way of example, and not limitation, communication interface 970 may couple to wired media (e.g., a wired network, direct-wired connection, etc.) and/or wireless media (e.g., a wireless network, a wireless connection utilizing acoustic, radio frequency (RF), infrared, or other wireless signaling, etc.).

Communication interface 970 may also couple computer system platform 900 to one or more input devices (e.g., a keyboard, mouse, pen, voice input device, touch input device or touch screen, etc.). In one embodiment, communication interface 970 may couple computer system platform 900 to one or more output devices (e.g., a display, speaker, printer, etc.).

As shown in FIG. 9, graphics processor 950 may perform graphics processing operations on graphical data stored in frame buffer 960 or another memory (e.g., 920, 940, 945, etc.) of computer system platform 900. Graphical data stored in frame buffer 960 may be accessed, processed, and/or modified by components (e.g., graphics processor 950, processor 910, etc.) of computer system platform 900 and/or components of other systems/devices. Additionally, the graphical data may be accessed (e.g., by graphics processor 950) and displayed on an output device coupled to computer system platform 900. Accordingly, memory 920, removable storage 940, non-removable storage 945, frame buffer 960, or a combination thereof, may be a computer-readable medium or computer-usable medium and may include instructions that when executed by a processor (e.g., 910, 950, etc.) implement a method of deskewing data (e.g., in accordance with process 600 of FIG. 6), a method of determining a memory of a plurality of memories that is the last memory to receive an initial portion of data (e.g., in accordance with process 700 of FIG. 7), some combination thereof, etc.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of deskewing data performed by a processor of a computing system, said method comprising:
   determining a memory of a plurality of memories that is a last memory to receive an initial portion of data associated with a frame, wherein said initial portion is one initial portion of a plurality of initial portions of said data, wherein each memory of said plurality of memories receives a respective initial portion of said plurality of initial portions of said data, and wherein each memory of said plurality of memories is associated with a respective write pointer of a plurality of write pointers;
   determining, based on a write pointer associated with said memory, an address at which said initial portion of said data is stored in said memory; and
   setting a read pointer associated with said plurality of memories to said address to allow said plurality of initial portions of said data to be contemporaneously read from said plurality of memories.

2. The method of claim 1, wherein each memory of said plurality of memories comprises a respective FIFO buffer.

3. The method of claim 1, wherein said determining said memory further comprises:
   setting said plurality of write pointers to an initial value responsive to receiving each initial portion of said plurality of initial portions of said data;
   incrementing at least one write pointer of said plurality of write pointers responsive to receiving at least one other portion of said data associated with said frame;
   performing a comparison of a value of said write pointer associated with said memory to at least one other value of at least one other write pointer of said plurality of write pointers; and
   determining said memory responsive to determining that said value is lower than said at least one other value.

4. The method of claim 1, wherein said determining said memory further comprises setting a respective flag of a plurality of flags for each write pointer of said plurality of write pointers that reaches a predetermined value, and wherein said performing a comparison further comprises:
   if a first flag of said plurality of flags is set and a second flag of said plurality of flags is not set, excluding a first value of a first write pointer associated with said first flag from said at least one other value used in said comparison.

5. The method of claim 1 further comprising:
   accessing said plurality of initial portions of said data;
   determining, using a plurality of framers, an alignment of said plurality of initial portions of said data, wherein each framer of said plurality of framers is associated with a respective memory of said plurality of memories; and
   writing, using said plurality of framers, said plurality of initial portions of said data into said plurality of memories in an aligned manner based on said alignment.

6. The method of claim 1 further comprising:
   contemporaneously reading, based on a value of said read pointer associated with said plurality of memories, said plurality of initial portions of said data from said plurality of memories.

7. The method of claim 1, wherein said plurality of memories are included in a programmable logic device, and wherein said determining said memory, determining said address, and said setting a read pointer are implemented using said programmable logic device.

8. A non-transitory computer-readable medium having computer-readable program code embodied therein for causing a computer system to perform a method of deskewing data, said method comprising:
   determining a memory of a plurality of memories that is a last memory to receive an initial portion of data associated with a frame, wherein said initial portion is one initial portion of a plurality of initial portions of said data, wherein each memory of said plurality of memories receives a respective initial portion of said plurality of initial portions of said data, and wherein each memory of said plurality of memories is associated with a respective write pointer of a plurality of write pointers;

determining, based on a write pointer associated with said memory, an address at which said initial portion of said data is stored in said memory; and setting a read pointer associated with said plurality of memories to said address to allow said plurality of initial portions of said data to be contemporaneously read from said plurality of memories.

9. The computer-readable medium of claim 8, wherein each memory of said plurality of memories comprises a respective FIFO buffer.

10. The computer-readable medium of claim 8, wherein said determining said memory further comprises:

setting said plurality of write pointers to an initial value responsive to receiving each initial portion of said plurality of initial portions of said data;

incrementing at least one write pointer of said plurality of write pointers responsive to receiving at least one other portion of said data associated with said frame;

performing a comparison of a value of said write pointer associated with said memory to at least one other value of at least one other write pointer of said plurality of write pointers; and determining said memory responsive to determining that said value is lower than said at least one other value.

11. The computer-readable medium of claim 8, wherein said determining said memory further comprises setting a respective flag of a plurality of flags for each write pointer of said plurality of write pointers that reaches a predetermined value, and wherein said performing a comparison further comprises:

if a first flag of said plurality of flags is set and a second flag of said plurality of flags is not set, excluding a first value of a first write pointer associated with said first flag from said at least one other value used in said comparison.

12. The computer-readable medium of claim 8, wherein said method further comprises:

accessing said plurality of initial portions of said data;

determining, using a plurality of framers, an alignment of said plurality of initial portions of said data, wherein each framer of said plurality of framers is associated with a respective memory of said plurality of memories; and writing, using said plurality of framers, said plurality of initial portions of said data into said plurality of memories in an aligned manner based on said alignment.

13. The computer-readable medium of claim 8, wherein said method further comprises:

contemporaneously reading, based on a value of said read pointer associated with said plurality of memories, said plurality of initial portions of said data from said plurality of memories.

14. The computer-readable medium of claim 8, wherein said plurality of memories are included in a programmable logic device, and wherein said determining said memory, determining said address, and said setting a read pointer are implemented using said programmable logic device.

15. A system comprising a processor and a memory, wherein said memory comprises instructions that when executed by said system implement a method of deskewing data, said method comprising:

determining a memory of a plurality of memories that is a last memory to receive an initial portion of data associated with a frame, wherein said initial portion is one initial portion of a plurality of initial portions of said data, wherein each memory of said plurality of memories receives a respective initial portion of said plurality of initial portions of said data, and wherein each memory of said plurality of memories is associated with a respective write pointer of a plurality of write pointers;

determining, based on a write pointer associated with said memory, an address at which said initial portion of said data is stored in said memory; and setting a read pointer associated with said plurality of memories to said address to allow said plurality of initial portions of said data to be contemporaneously read from said plurality of memories.

16. The system of claim 15, wherein each memory of said plurality of memories comprises a respective FIFO buffer.

17. The system of claim 15, wherein said determining said memory further comprises:

setting said plurality of write pointers to an initial value responsive to receiving each initial portion of said plurality of initial portions of said data;

incrementing at least one write pointer of said plurality of write pointers responsive to receiving at least one other portion of said data associated with said frame;

performing a comparison of a value of said write pointer associated with said memory to at least one other value of at least one other write pointer of said plurality of write pointers; and determining said memory responsive to determining that said value is lower than said at least one other value.

18. The system of claim 15, wherein said determining said memory further comprises setting a respective flag of a plurality of flags for each write pointer of said plurality of write pointers that reaches a predetermined value, and wherein said performing a comparison further comprises:

if a first flag of said plurality of flags is set and a second flag of said plurality of flags is not set, excluding a first value of a first write pointer associated with said first flag from said at least one other value used in said comparison.

19. The system of claim 15, wherein said method further comprises:

accessing said plurality of initial portions of said data;

determining, using a plurality of framers, an alignment of said plurality of initial portions of said data, wherein each framer of said plurality of framers is associated with a respective memory of said plurality of memories; and writing, using said plurality of framers, said plurality of initial portions of said data into said plurality of memories in an aligned manner based on said alignment.

20. The system of claim 15, wherein said method further comprises:

contemporaneously reading, based on a value of said read pointer associated with said plurality of memories, said plurality of initial portions of said data from said plurality of memories.

21. The system of claim 15, wherein said plurality of memories are included in a programmable logic device, and wherein said determining said memory, determining said address, and said setting a read pointer are implemented using said programmable logic device.

* * * * *